(No Model.)

C. F. LEOPOLD.
TRANSOM LIFTER.

No. 345,238. Patented July 6, 1886.

WITNESSES:
Th. Rolle.
W. F. Kirches

INVENTOR:
Charles F. Leopold.
BY
ATTORNEY.

UNITED STATES PATENT OFFICE.

CHARLES F. LEOPOLD, OF PHILADELPHIA, PENNSYLVANIA, ASSIGNOR TO THE AMERICAN MANUFACTURING COMPANY, OF SAME PLACE.

TRANSOM-LIFTER.

SPECIFICATION forming part of Letters Patent No. 345,238, dated July 6, 1886.

Application filed April 8, 1886. Serial No. 198,224. (No model.)

*To all whom it may concern:*

Be it known that I, CHARLES F. LEOPOLD, a citizen of the United States, residing in the city and county of Philadelphia, State of Pennsylvania, have invented a new and useful Improvement in Transom-Lifters, which improvement is fully set forth in the following specification and accompanying drawings, in which—

Figure 1:
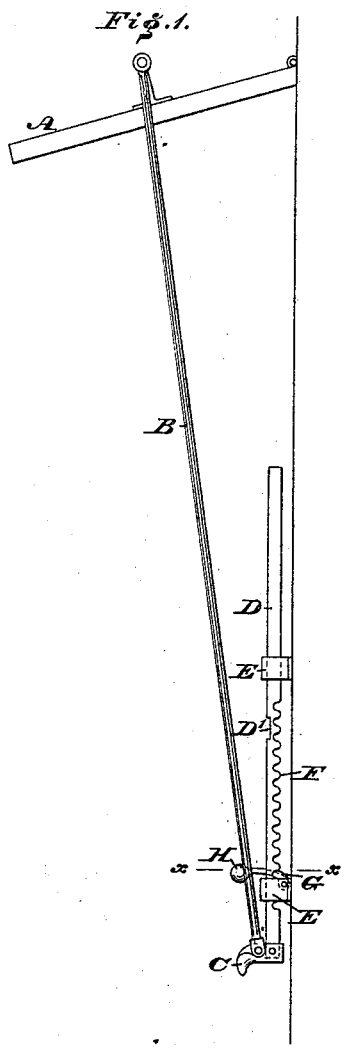
Figure 2:
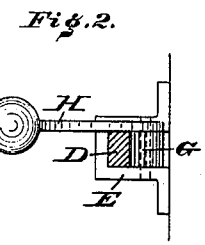

Figure 1 represents a side elevation of a a transom-lifter embodying my invention. Fig. 2 represents a horizontal section thereof on an enlarged scale.

Similar letters of reference indicate corresponding parts in the two figures.

My invention consists of a transom-lifter formed of a rod which is pivoted to the lower end of the guiding-bar, whereby the transom or window may be raised with ease.

It also consists in providing the guiding-bar with a locking device, which is mounted on the guide of said bar, and consists of a pivoted pawl having a weighted arm attached thereto, the latter serving for a handle to operate the said pawl, as well as forming means to automatically lock the said bar by forcing the pawl into engagement with the teeth of the bar, as will be hereinafter fully set forth.

Referring to the drawings, A represents a transom or transom-window of usual form.

B represents a rod, which is pivoted at top to the transom and at bottom to a thumb-piece or handle, C, by which said rod may be readily raised, said piece being connected with the lower end of a vertically-arranged bar, D, which is passed through guides or eyes E, the latter being secured in position on the frame of the door or other suitable locality, the bar extending below the lower guide. If desired, the rod B may be pivoted directly to the lower end of the bar D, and the thumb-piece fixed to said rod without affecting the operation of the rod. On the inner or rear side of the bar D are serrations or teeth F, with which is adapted to engage a dog, G, the latter being pivoted to or journaled on one of the guides E, and provided with a weighted handle, H, which serves to hold the dog G engaged with either of the teeth F, the dog and serrations acting after the manner of a pawl and ratchet. It will be seen that the transom may be readily lifted by means of the thumb-piece C, the dog G riding freely over the teeth F. When the transom is opened to the required extent, the thumb-piece is let go, and the dog G automatically engages with the adjacent tooth of the bar D, and locks the latter, preventing the descent of the same, and consequently of the transom, the handle H holding the dog securely engaged with the tooth. When it is required to close the transom to partial or entire extent, the dog G is operated, whereby it clears the tooth of the bar D, the bar having been slightly raised to permit the same, and the transom lowers or closes, the thumb-piece C being engaged by hand so as to control the motion of the transom. As the rod B is pivoted to the lower end of the bar D, it has a long leverage, whereby the transom may be raised with ease, it being well known that a short rod has been connected with a transom and the upper end of a lifting bar or rod, the same requiring greater power to raise the transom than in my case. When the transom is closed, it is prevented from being raised or opened by means of the bar D, which engages with the lower guide E, said bar having a recess, D', whereby when the bar is at its lowest position, it having a slight lateral play in said guide E, the walls of the recess embrace the guide, and thus prevent vertical movement of the bar, the latter being held against the guide by means of the dog G.

Having thus described my invention, what I claim as new, and desire to secure by Letters Patent, is—

1. A transom-lifter having a vertically-moving bar, a guide, and a rod pivoted to said bar and the transom, the bar continuing below the lower guide, and the rod being pivoted to the lower end of said bar, substantially as and for the purpose set forth.

2. A transom-lifter having a vertically-moving toothed bar, a guide for said bar, and a gravitating pawl supported on said guide and adapted to engage with the teeth of said bar and lock the same, said pawl being of the form of a tooth, having a weighted handle and provided with pivots which are mounted on the sides of the guides, substantially as and for the purpose set forth.

3. A transom-lifter having a vertically-moving toothed bar, a guide for the same, a locking-dog for said bar, and a rod, the dog being journaled on the guide, the bar extending below the guide, and the rod being pivoted to the transom and the lower end of the toothed bar, substantially as described.

CHARLES F. LEOPOLD.

Witnesses:
JOHN A. WIEDERSHEIM,
W. F. KIRCHER.